(12) United States Patent
Mahfoudi et al.

(10) Patent No.: US 12,002,250 B2
(45) Date of Patent: Jun. 4, 2024

(54) METHOD FOR PROCESSING DIGITAL IMAGES

(71) Applicant: SURYS, Marne la Vallee (FR)

(72) Inventors: Gaël Mahfoudi, Capens (FR); Mohammed Amine Ouddan, Le Perreux sur Marne (FR)

(73) Assignee: SURYS, Marne la Vallee (FR)

( * ) Notice: Subject to any disclaimer, the term of this patent is extended or adjusted under 35 U.S.C. 154(b) by 156 days.

(21) Appl. No.: 17/421,486

(22) PCT Filed: Jan. 8, 2020

(86) PCT No.: PCT/EP2020/050298
§ 371 (c)(1),
(2) Date: Jul. 8, 2021

(87) PCT Pub. No.: WO2020/144225
PCT Pub. Date: Jul. 16, 2020

(65) Prior Publication Data
US 2022/0067422 A1 Mar. 3, 2022

(30) Foreign Application Priority Data

Jan. 8, 2019 (FR) ...................................... 1900137

(51) Int. Cl.
*G06K 9/00* (2022.01)
*G06T 7/13* (2017.01)
(Continued)

(52) U.S. Cl.
CPC ................ *G06V 10/42* (2022.01); *G06T 7/13* (2017.01); *G06V 10/426* (2022.01);
(Continued)

(58) Field of Classification Search
CPC ....... G06T 7/13; G06V 10/462; G06V 40/171
See application file for complete search history.

(56) References Cited

U.S. PATENT DOCUMENTS 9,058,765 B1 * 6/2015 Mallick .............. G06Q 30/0256
2003/0146901 A1 8/2003 Ryan
(Continued)

FOREIGN PATENT DOCUMENTS

EP 2608108 A1 * 6/2013 ......... G06K 9/00221

OTHER PUBLICATIONS

A unified Gradient-Based Approach for combining ASM and AAM, Jaewon Sung et al., SPRINGER, 2007, pp. 297-300 (Year: 2007).*
(Continued)

*Primary Examiner* — Jayesh A Patel
(74) *Attorney, Agent, or Firm* — TraskBritt

(57) ABSTRACT

A method for processing a candidate digital image includes defining a set of noteworthy points in the candidate digital image. A set of at least three noteworthy points is selected to comprise a notable departure point, a notable arrival point, and a third notable point not aligned with the notable departure point and the notable arrival point. A set of at least one route, between the notable departure point and the notable arrival point, is defined. The route passes through all of the selected notable points. Local characteristics, of the pixels located along the route, are extracted. The signal, corresponding to the variation in the magnitude of the local characteristics as a function of each pixel along each defined route, is recorded in the form of a fingerprint.

13 Claims, 6 Drawing Sheets

(51) Int. Cl.
   *G06V 10/42* (2022.01)
   *G06V 10/426* (2022.01)
   *G06V 10/46* (2022.01)
   *G06V 40/16* (2022.01)

(52) U.S. Cl.
   CPC .......... *G06V 10/462* (2022.01); *G06V 40/165* (2022.01); *G06V 40/171* (2022.01); *G06V 40/172* (2022.01)

(56) References Cited

U.S. PATENT DOCUMENTS

| | | | | |
|---|---|---|---|---|
| 2012/0183238 | A1* | 7/2012 | Savvides | G06V 20/64 382/285 |
| 2013/0155063 | A1* | 6/2013 | Solem | G06V 40/169 345/420 |
| 2013/0169827 | A1* | 7/2013 | Santos | G06V 40/171 382/173 |
| 2013/0322708 | A1* | 12/2013 | Heringslack | G06V 40/16 382/118 |
| 2016/0086304 | A1* | 3/2016 | Hsieh | G06T 11/00 382/201 |
| 2016/0379050 | A1* | 12/2016 | Tian | G06V 40/40 382/118 |
| 2018/0197330 | A1* | 7/2018 | Wang | G06V 40/169 |
| 2019/0354822 | A1* | 11/2019 | Pic | G07D 7/2016 |
| 2020/0402253 | A1* | 12/2020 | Ivanov Bonev | G06V 40/165 |
| 2021/0218885 | A1* | 7/2021 | Tham | G06F 3/0482 |

OTHER PUBLICATIONS

A Hybrid Facial Feature Optimisation Approach using Bezier Curve, Manish Dixit et al., IEEE, 2015, pp. 218-221 (Year: 2015).*
Eyes Do Not Lie: Spontaneous versus Posed Smiles, Hamdi Dibeklioglu et al., ACM, 2010, pp. 703-706 (Year: 2010).*
Modifications in Human Face Image for Personal Identification, Mansi Dixit et al., TRANS, 2014, pp. 13-22 (Year: 2014).*
A Unified Facial Feature Pointdatabase, Pan Gao et al., Springer, 2014, pp. 145-154 (Year: 2014).*
Emotional Recognition from Facial Expression Analysis using Bezier Curve Fitting, Yong-Hwan Lee et al., IEEE, 2013, pp. 250-254 (Year: 2013).*
Bay et al. "SURF: Speeded Up Robust Features" ECCV 2006, Part I, LNCS 3951, pp. 404-417.
International Search Report for International Application No. PCT/EP2020/050298, dated Feb. 21, 2020, 5 pages with English translation.
International Written Opinion for International Application No. PCT/EP2020/050298, dated Feb. 21, 2020, 10 pages with English machine translation.
Lowe "Object Recognition from Local Scale-Invariant Features" IEEE International Conference on Computer Vision, pp. 1150-1157 (Sep. 1999).
Sung et al. "A Unified Gradient-Based Approach for Combining ASM into AAM" International Journal of Computer Vision, 75(2), 297-309, 2007.

* cited by examiner

METHOD FOR PROCESSING DIGITAL IMAGES

CROSS-REFERENCE TO RELATED APPLICATIONS

This application is a national phase entry under 35 U.S.C. § 371 of International Patent Application PCT/EP2020/050298, filed Jan. 8, 2020, designating the United States of America and published as International Patent Publication WO 2020/144225 A1 on Jul. 16, 2020, which claims the benefit under Article 8 of the Patent Cooperation Treaty to French Patent Application Serial No. FR1900137, filed Jan. 8, 2019.

TECHNICAL FIELD

The present disclosure relates to the field of authentication of an illustration (e.g., any non-uniform graphic representation, such as a painting, a drawing, a photograph, etc., in digital-image form). For the sake of brevity, only the case where the illustration is a photograph, and, in particular, a portrait, will be described here. In this context, the present disclosure is particularly applicable to the field of verification of identity documents comprising a photograph of the bearer of an identity document, whether it is an official identity document (identity card, passport, driver's license, etc.) or unofficial identity document (subscription card, etc.).

BACKGROUND

The falsification of identity documents mainly involves the replacement of the identity photo. Though for a long time this replacement could be a quite summary affair, it has in recent years become more complex with the advent of "morphed" images.

By "morphed" image, what is meant is the image resulting from a morphological transformation or morphing, between the original photograph of the legitimate bearer of the identity document and the photograph of a fraudster who wishes to use this identity document.

The manipulated identity document is, for example, chosen, by the fraudster, so that the legitimate bearer shares a certain number of morphological features with the fraudster. This morphological resemblance between the legitimate bearer and the fraudster facilitates the work of the forger, who prints this morph onto the identity document (while keeping the other security elements intact), this allowing a visual, and sometimes even an automatic inspection, to be passed, while retaining visual compatibility with the other security elements of the identity document that replicate the photograph, such as, for example, a ghost image, an image formed by piercing holes, etc.

The objective of embodiments of the present disclosure is therefore to ensure that the illustration, in this case the photograph present on the identity document, is the original, i.e., it has not been manipulated in one way or another. It is therefore a question of authenticating the illustration and not of authenticating the bearer of the document or the subject of the photograph. In this sense, the present disclosure relates to photometry and not to biometry.

Embodiments of the present invention allow a given illustration to be authenticated at two different times, despite the inevitable damage that occurs during the life cycle of the illustration or of a document bearing it.

Embodiments of the present disclosure may also make it possible to authenticate that the copy of an illustration conforms to the original.

It obviously applies to the field of security, and to the field of art.

Document US2003/146901 is known, which aims to follow the route of the eyes of a person in front of a screen in order to analyze what is being watched. This document therefore makes provision to perform a dynamic analysis whereas embodiments of the present disclosure make provision to perform a static image analysis. Furthermore, this document involves the use of a 3D model, which is resource-intensive to implement, this not being the case with embodiments of the present disclosure. Lastly, contrary to embodiments of the present disclosure, this document aims to implement linear routes between a departure point and an arrival point. This linearity makes forgery simpler because it is easier for a fraudster to simulate the variation in intensity along such routes.

BRIEF SUMMARY

More precisely, the disclosure relates, according to a first of its subjects, to a method for processing a candidate digital image, comprising:
defining a set of notable points on the candidate digital image.

It is essentially characterized in that it further comprises:
selecting a set of at least three notable points, comprising a notable departure point, a notable arrival point, and a third notable point not aligned with the notable departure point and the notable arrival point;
defining a set of at least one route between the notable departure point and the notable arrival point, the route being constrained by all of the selected notable points;
extracting local characteristics of the pixels located along the route; and
recording the signal corresponding to the variation in the local characteristics as a function of each pixel along each defined route in fingerprint form.

Provision may also be made for:
comparing the fingerprint of the digital image to a reference fingerprint; and
generating a signal the value of which depends on the result of the comparison.

Provision may also be made for:
defining a set of notable points on a reference digital image;
selecting a set of at least two notable points on the reference digital image;
defining a set of at least one route passing through the notable points selected on the reference digital image;
determining at least one local characteristic of each pixel along each defined route; and
recording by way of reference fingerprint the signal corresponding to the variation in the local characteristics as a function of each pixel along each route defined on the reference digital image,
the notable points selected on the reference digital image being the same as the notable points selected on the candidate digital image.

Provision may be made for defining a set of at least one route to comprise defining a linear or curved route between two consecutive notable points, the definition of a curved route optionally comprising:

constraining the route with a set of Bézier curves that pass through the selected notable points, or that minimize the distance to the selected notable points.

Provision may be made for filtering at least one among the candidate digital image and the reference digital image, with a band-pass filter or a low-pass filter, prior to the act of recording the fingerprint, and for the filtering act to optionally comprise decomposing the signal via a discrete cosine transform.

Provision may be made for the act of defining a set of notable points to comprise applying at least one among algorithms based on:
- a Harris detector,
- a scale-invariant feature transform,
- speeded-up robust features,
- an algorithm for detecting biometric points,
- a derivation operator, in particular, a difference-of-Gaussians operator, and
- an edge-detecting algorithm, in particular, a Laplacian-of-Gaussian edge-detecting algorithm.

Provision may be made for the act of comparing the fingerprint of the digital image to a reference fingerprint to comprise computing a Pearson correlation coefficient.

Provision may be made for the act of extracting the local characteristics to comprise extracting at least one among local characteristics among:
- light intensity,
- the intensity of one or two predetermined colors,
- the high-frequency density above a predetermined threshold in a set of pixels around the pixels on the route,
- the orientation of the edges of the shapes in the image and crossed by the curve of the route at each point on the route, and
- the direction of the lightness gradient at each point on the route.

Provision may be made to define a plurality of routes between the notable departure point and the notable arrival point.

According to another of its subjects, the disclosure relates to a computer program comprising program-code instructions for executing the acts of the method according to the disclosure, when the program is executed on a computer.

Advantageously, no data relating to a person is recorded. Furthermore, it is not a question of recording biometric information but merely of processing local characteristics, for example information on light intensity, density or gradient, related to the captured image in the case of a photograph, and optionally based on the position of biometric points. Thus, in the case of an image relating to a face, it is not possible to determine the physical characteristics of the person. Embodiments of the present disclosure therefore comply with GDPR (General Data Protection Regulation 2016/679).

It is possible to select a non-biometric point by way of notable point. It is also possible to select notable points comprising at least one biometric point and at least one non-biometric point, for example, a clothing element, a background element, etc.

Other features and advantages of embodiments of the present disclosure will become more clearly apparent on reading the following description, which is given by way of illustrative and non-limiting example, and with reference to the accompanying figures.

DETAILED DESCRIPTION

Figure 1A:
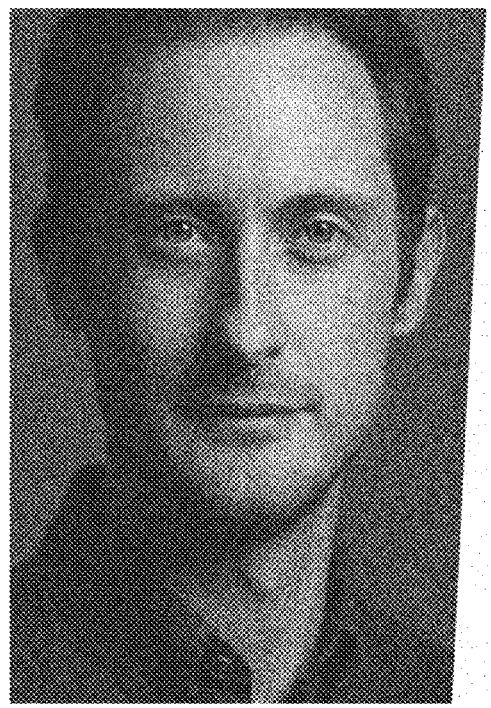
FIG. 1A illustrates one embodiment of a reference image.
Figure 1B:
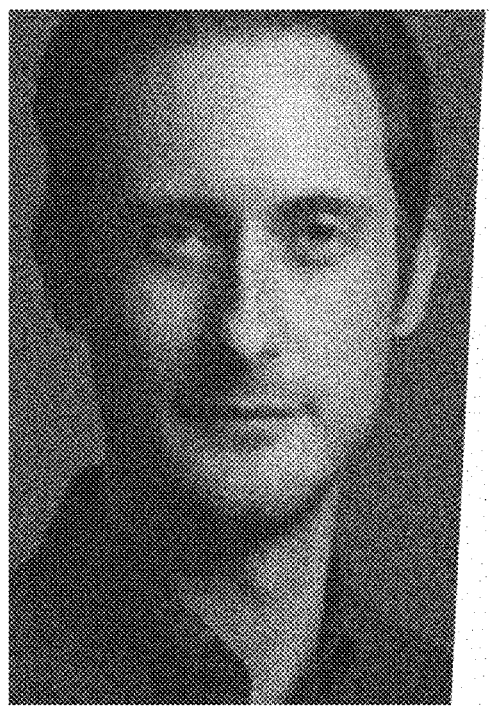
FIG. 1B illustrates the reference image FIG. 1A filtered according to embodiments of the disclosure.

For the sake of brevity, only the case where a digital image is a portrait will be illustrated here. For the sake of brevity also, a "digital image" will generally be denoted an "image" in the remainder of the present description.

Embodiments of the present disclosure may be implemented on any non-uniform content of an image. It may be a question of a representational content, and in particular: of a human portrait; of the head of a thoroughbred animal, for example for a horse passport, or of a non-thoroughbred animal, etc. It may also be non-representational content, an abstract work of art, etc.

The image may be a digital photograph, a digitized film photograph, an electronic drawing file, a computer-generated image, etc.

As described in detail below, embodiments of the present disclosure allow a candidate image to be authenticated via comparison with a reference image.

The candidate image may be the reference image, which has aged over time. The candidate image may also be a copy of the reference image, and embodiments of the present disclosure make it possible to verify whether the copy conforms to the original.

Reference Image

Provision is made to provide an image, called the "reference image." It is stored on any suitable medium, for example a memory of a server.

Preferably, the reference image is processed so that its resolution is lower than its native resolution. To this end, provision may be made for the reference image to be filtered with a low-pass filter or a band-pass filter, in the present case with a non-linear filter, to remove the information contained in the high frequencies, and to preserve only the macroscopic information of the reference image.

Specifically, a digital image may be degraded by a printing process (loss of resolution). Likewise, the physical medium of the digital image may be damaged over time (scratches, etc.). Filtering high frequencies makes it possible to limit or even overcome these effects.

The routes described below are therefore advantageously defined on the filtered reference image.

Notable Points

Provision is made to define a set of notable points 10 on the reference image.

A notable point is a point that it is possible to accurately locate on various versions/copies of the same image.

For example, a notable point may be defined as a point on the image, i.e., a pixel or a set of pairwise adjacent pixels, the contrast gradient of which, in a predefined direction and over a predefined distance, is higher than a predefined threshold value.

A set of notable points may be defined by any known means, for example by one among:
 a Harris detector,
 a scale-invariant feature transform,
 speeded-up robust features,
 an algorithm for detecting biometric points,
 a derivation operator, in particular a difference-of-Gaussians operator, and
 an edge-detecting algorithm, in particular a Laplacian-of-Gaussian edge-detecting algorithm.

The scale-invariant feature transform is better known by its acronym SIFT.

With SIFT, which is notably described in the publication D. Lowe. Object recognition from local scale-invariant features. IEEE International Conference on Computer Vision, pages 1150-1157, 1999, point detection is based on differences of Gaussians (DoG), which are obtained by computing the difference between each pair of images smoothed by a Gaussian filter, the sigma parameter (i.e., the standard deviation) of the filter being different each time. DoGs may be computed for various scale levels, allowing the notion of scale space to be introduced. Potential regions of points of interest/notable points are detected by looking for the extrema in the plane of the extent of the image (x, y) and the plane of the scale factor. Next, a filtering step is required to remove irrelevant points, and, for example, to remove points the contrast of which is too low.

Speeded-up robust features is better known by its acronym SURF. It is notably described in the publication H. Bay, T. Tuylelaars, and L. Van Gool. Surf: Speeded up robust features. European Conference on Computer Vision, pages 404-417, 2006; this method consists in using the determinant of the Hessian matrix, and in computing an approximation of the second derivatives of the Gaussians of the image by way of filters at various scales using masks of various sizes (for example, 9×9, 15×15, 21×21, etc.). Sums of the Haar-wavelet responses in the horizontal and vertical directions, and their norms, are used to compute the orientation of the points and descriptors of the environment of the points. The description neighborhood, which is circular, is divided into 16 regions. A wavelet analysis is performed on each region in order to construct the final descriptor. The latter is made up of the sum of the gradients in x and in y and of the sum of their respective norms for all 16 regions. The descriptor vector is thus made up of 64 values, which represent properties extracted both in normal space and in scale space.

A notable point may be a biometric point. For the detection of biometric points, it is possible to apply a software package based on the DLIB software library, and which determines the position of a set of predetermined biometric points, each point corresponding to one predetermined morphological element of a face, for example the corner of the right eye, the corner of the left eye, the bottom of the nose, the corners of the mouth, etc. as illustrated in FIGS. 2A to 2E, in which each circle indicates one biometric point.

Thus a notable point in the sense of the present disclosure is relative—it is not defined exclusively by its coordinates, but, for example, in the case of a DLIB software library, by a predetermined morphological element of a face. By virtue of this relativity, it is easy to compare the notable points of a candidate image with the same reference points of a reference image.

Depending on the means employed to define a set of notable points, the number of notable points may be relatively high or low.

Advantageously, therefore, provision is made to select a set of at least two notable points on the reference digital image.

For example, in FIGS. 2A to 2E four selected notable points, which are identical to one another, have been illustrated by circles.

A notable point may also be defined, for example for artistic applications, depending on the informational content of the image, according to pre-established instructions, for example "the tip of the steeple, the dog's nose, the chimney of the red house, etc." The selection may then be made, for example, by an operator using any known pointer.

Lastly, a notable point may also be defined by the absolute position of its pixel or of the centroid of a set of pairwise adjacent pixels. For example, a notable point is located 15 pixels to the right and 10 pixels below the top left corner of the image. Preferably, a notable point may also be defined by its relative position with respect to the dimensions of the image. For example, a notable point is located at 8% of the width of the image and at 6% of the height of the image starting from the top left corner of the image. This type of determination may be useful, for example, in certain machines for inspecting identity photographs, in which the position of the eyes is predefined, i.e., constrained, by one or more marks on the screen of the machine. The position of the pixels corresponding to the eyes is therefore known and may be used as notable points.

Route

Figure 2A:
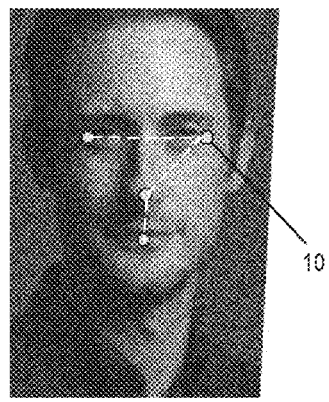
FIG. 2A illustrates a route on the reference image of FIG. 1B according to embodiments of the disclosure.
Figure 2B:
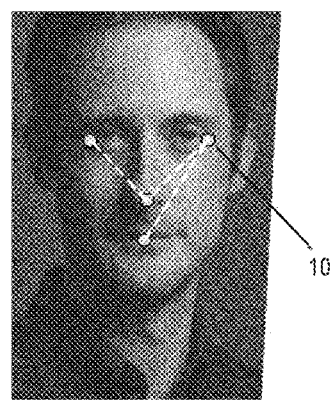
FIG. 2B illustrates a route on the reference image of FIG. 1B with the same notable points as those of FIG. 2A according to embodiments of the disclosure.
Figure 2C:
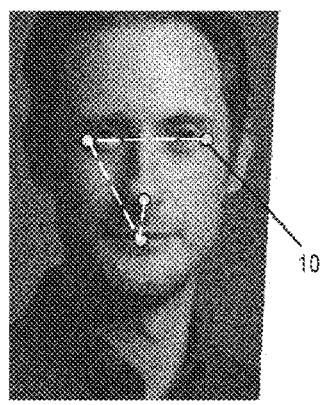
FIG. 2C illustrates a route on the reference image of FIG. 1B with the same notable points as those of FIG. 2A according to embodiments of the disclosure.

Provision is made to define a route constrained by the selected notable points, the route being illustrated by a dashed arrow in each of FIGS. 2A, 2B and 2C.

To constrain by means of the selected notable points, it is, for example, possible to use Bézier curves that then define the route.

The Bézier curves may pass through the selected notable points. Alternatively, they may not pass through the selected notable points but minimize the distance to these selected notable points for a given constraint, in the present case the degree of the curve.

There is therefore one notable departure point and one notable arrival point and the route is constrained by all the selected notable points. In the present case, the route is constrained at least by a third selected notable point, which is not aligned with the notable departure point and the notable arrival point. The non-alignment makes it possible to make the method according to embodiments of the disclosure even more robust.

For example, in FIGS. 2A and 2B, the notable departure point may be the corner of the right eye, and the notable arrival point the center of the lower lip. In the present case, the corner of the left eye was selected as a third notable departure point and the tip of the nose was selected as a fourth notable point.

To get from the notable departure point to the notable arrival point, while being constrained by the other selected notable points, i.e., in this case passing through the third notable point and the fourth notable point, a plurality of routes may be defined.

In the present case, it is possible to define a first route (FIG. 2A) that starts at the notable departure point and passes through the third notable point then through the fourth notable point before ending at the notable arrival point; and a second route (FIG. 2B) that starts at the notable departure point and passes through the fourth notable point then through the third notable point before ending at the notable arrival point.

Of course, the route may pass through a set of predetermined notable points.

The route is therefore a path that starts at a notable departure point and ends at a notable arrival point, and that is constrained by (and where appropriate, passes through) other predetermined notable points.

In this way, it is possible to obtain a signal by extracting the local characteristics of pixels, notably pairwise adjacent pixels, located along the route.

Preferably, the path between two successive notable points is straight, this simplifying the computations.

Figure 2D:
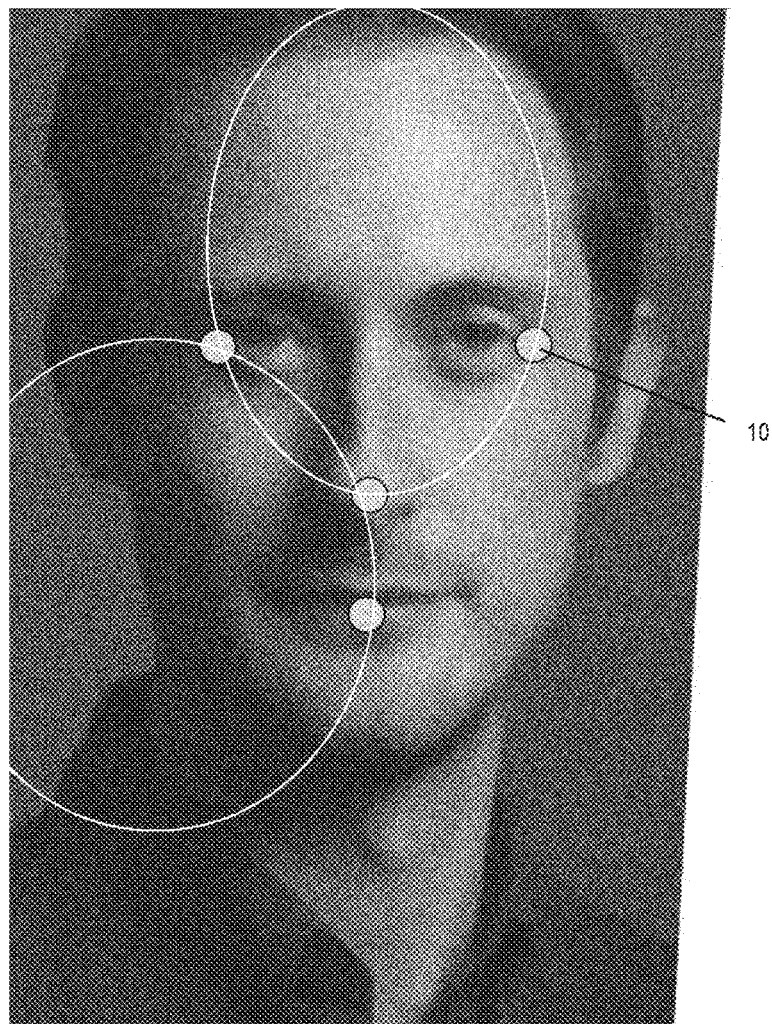
FIG. 2D illustrates the non-linear construction of a route on the reference image of FIG. 1B with the same notable points as those of FIG. 2A according to embodiments of the disclosure, used for the definition of the route of FIG. 2E.
Figure 2E:
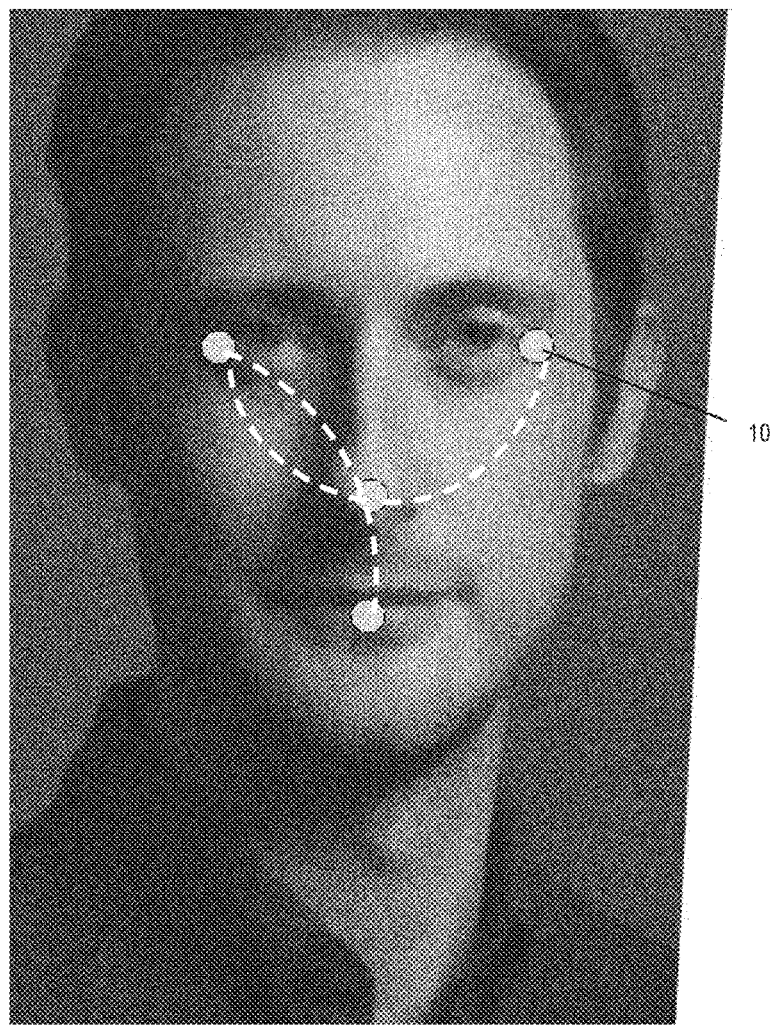
FIG. 2E illustrates a route on the reference image of FIG. 1B with the same notable points as those of FIG. 2A according to embodiments of the disclosure.

It is also possible to provide a more complex path, for example one comprising circular arcs, each circular arc of which belongs to a circle or an ellipse passing through 3 predetermined notable points, as illustrated in FIG. 2D, in order to define a curved trajectory, such as illustrated in FIG. 2E.

Provision may also be made for polynomial curves of varying degrees (not illustrated).

As illustrated in FIGS. 2A, 2B and 2C, provision may be made for a plurality of routes for a given set of notable points of the same image.

For example, FIG. 2A and FIG. 2B show two different routes for the same notable departure point and the same notable arrival point.

In FIG. 2C, the notable points are the same as those of FIG. 2A and those of FIG. 2B, but the notable departure point and the notable arrival point are different; the route is therefore different in each of these figures.

Therefore, the fingerprint (described below) of FIG. 2A is different from the fingerprint of FIG. 2B, and also different from FIG. 2C.

Fingerprint

A fingerprint may be considered to be a signature of the image. Each route allows a respective fingerprint to be computed.

A fingerprint consists in determining a set of local characteristics of the pixels on a route, or of a predetermined set of pixels around the pixels on a route.

In one embodiment, provision is made to determine, by way of local characteristic, the light intensity of each pixel along each defined route. Since the position of the pixels along the route are known, it is easy to extract their respective intensity, for example by summing, depending on the type of image capture, the values of the pixels in each HSV or RGB channel.

In other embodiments, provision may also be made to determine, by way of local characteristics.
 the intensity of one or two predetermined colors (R, G, B);
 the high-frequency density above a predetermined threshold in a set of pixels around the pixels on the route, notably the pairwise adjacent pixels the number and the overall shape of which are predetermined, for example a moving square of 8×8 pixels around each pixel on the route;
 the orientation of the edges of the shapes in the image and crossed by the curve of the route at each point on the route;
 the direction of the lightness gradient at each point on the route;
 etc.

Figure 3A:
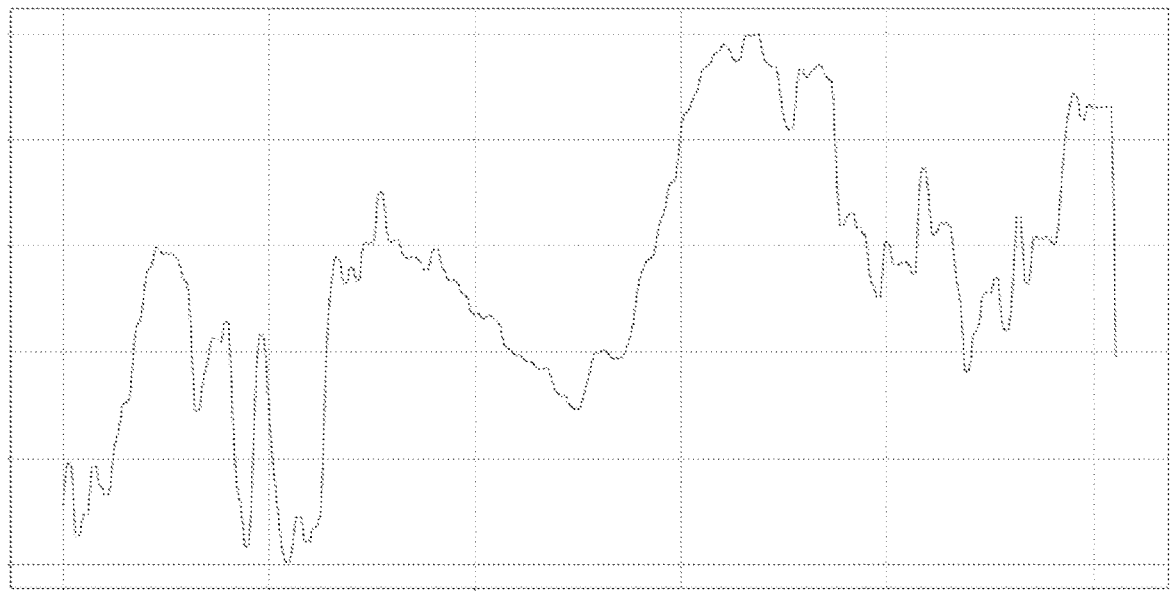
FIG. 3A illustrates the variation in the light intensity along the route of FIG. 2A according to embodiments of the disclosure.

It is then possible to store, by way of fingerprint, the signal corresponding to the variation in the local characteristics as a function of each pixel along each route defined on the image, as illustrated in FIG. 3A, which shows the variation in light intensity. In the present case, it is a question of the reference fingerprint on the reference image.

Decomposition

Advantageously, provision is made to decompose the signal, this making it possible to simplify it.

For example, provision is made to decompose the signal via a discrete cosine transform (DCT), this making it possible to obtain only the variations in the local characteristics.

Provision may also be made to decompose the signal via a wavelet or bandelet transform.

This decomposition makes it possible to keep a stable signal even in the case of physical degradation of the image, for example by a scratch.

For example, FIG. 3A illustrates the signal corresponding to the variation in the light intensity by way of local characteristic, as a function of each pixel along a predetermined route on a native-resolution image, for example the image of FIG. 1A.

Figure 3B:
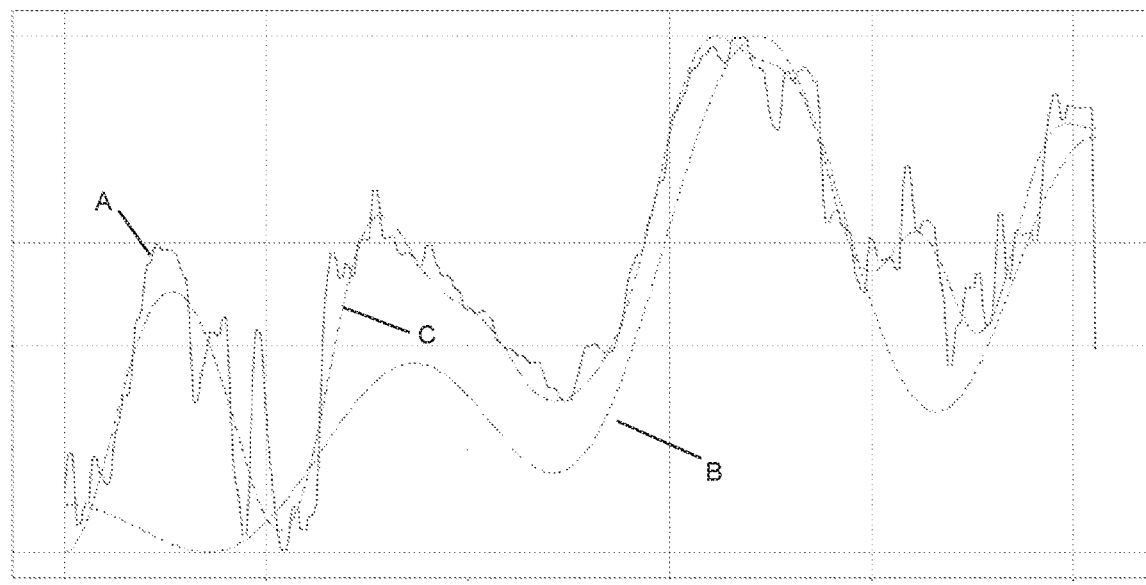
FIG. 3B illustrates the decomposition of the signal of FIG. 3A via a discrete cosine transform, for two values of the number of components thereof according to embodiments of the disclosure.

In FIG. 3B:
 signal A corresponds to the signal of FIG. 3A, which signal was obtained by filtering the image with a nonlinear filter;
 signal B is a decomposition of signal A via an 8-component discrete cosine transform, and
 signal C is a decomposition of signal A via a 20-component discrete cosine transform.

As illustrated in FIG. 3B, the lower the number of components of the discrete cosine transform, the smoother the resulting signal; and, the higher the number of components of the discrete cosine transform, the more the resulting signal is representative of the original signal but the higher its number of bytes. Specifically, the higher the number of components, the larger the size of the fingerprint, but the higher the accuracy of the comparison described below.

It is therefore desirable to find a compromise between the number of components of the discrete cosine transform and the size of the corresponding file (number of bytes).

For example, it is possible to determine a number of components that depends on the number of peaks in the signal. Advantageously, it is possible to consider only principal components up to a predetermined value.

As seen above, the image is preferably compressed via a nonlinear filter and the signal is also compressed via the decomposition, in the present case via a discrete cosine transform. As a result, the size of the file (number of bytes) corresponding to the fingerprint is small, while a representativeness of the content of the original image, i.e., the image before filtering with the non-linear filter, is advantageously guaranteed. As a result, it is easy to encode the characteristics of the image, for example into a two-dimensional barcode, this being an advantage with respect to encoding complete biometric characteristics and use off-line if necessary. On-line inspection is still preferred in the field of security.

Candidate Image

A candidate image is an image from which it is desired to obtain a fingerprint, notably with a view to verifying its conformity with a reference image.

As such, provision is made to take a fingerprint of the candidate image in the same way as the fingerprint of the filtered reference image was obtained, i.e., with the same algorithms, with the same notable points and with the same routes.

Comparison

It is then possible to compare the fingerprint of the candidate digital image to the reference fingerprint, and to generate a signal the value of which depends on the result of the comparison.

The comparison makes it possible to determine a distance between the reference image and the candidate image, this allowing a limit between fraudulent cases and genuine cases to be defined.

The fingerprint of the candidate digital image may be compared to the reference fingerprint by any known comparing means.

Preferably, provision is made to compute a correlation coefficient. In the present case, provision is made to compute a Pearson correlation coefficient.

This Pearson correlation coefficient defines the linear correlation between two random variables. It is comprised between −1 and 1; where −1 indicates that the two variables are completely negatively linearly correlated and +1 indicates that the variables are positively linearly correlated.

Computation of a Pearson correlation coefficient makes it possible to detect whether the two signals, i.e., the signal of the reference image and the signal of the candidate image, vary in the same way in the same places.

In the present case, provision is made to compute a similarity score S, which is obtained in the following way.

$S=(P+1)/2$ with P the Pearson correlation coefficient.

When the value of S is higher than a predetermined threshold value T, the signals are considered to be equal, and therefore the candidate image and the reference image are considered to be the same or the candidate image is considered to be a true copy of the reference image.

Figure 4:
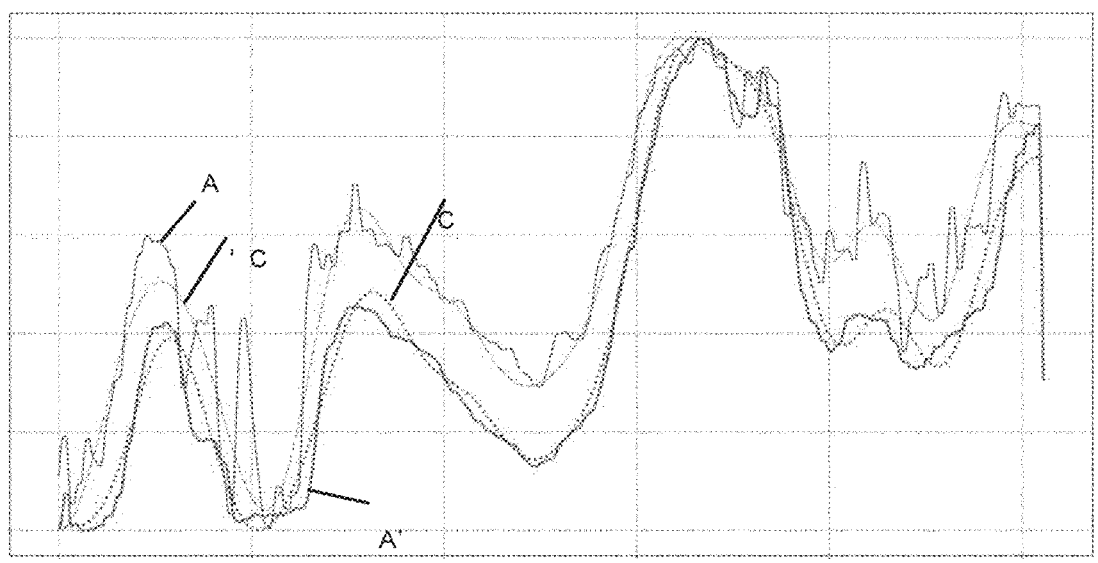
FIG. 4 illustrates the comparison of the fingerprint of a candidate image and of the fingerprint of a reference image according to embodiments of the disclosure.

For example, FIG. 4 illustrates the same fingerprint as that of FIG. 3B:
- signal A corresponds to the signal of FIG. 3A, which signal was obtained by filtering the image with a nonlinear filter, and
- signal C is a decomposition of signal A via a 20-component discrete cosine transform.

In the same coordinate system, FIG. 4 also illustrates:
- a signal A' corresponding to the signal of a candidate image, and
- a signal C', which is a decomposition of signal A' via a 20-component discrete cosine transform.

It may clearly be seen that the signals C and C' exhibit the same variations; it is concluded therefrom that the signals A and A' are correlated, and therefore that the candidate image and the reference image are identical.

It is possible to make provision to interpolate the signal of the reference image in one or another dimension, this making it possible to dispense with any resizing of the candidate image.

By virtue of embodiments of the disclosure, it is possible to prevent a digital portrait from being fraudulently altered, in particular as regards facial biometric features.

Embodiments of the present disclosure notably make it possible to identify whether a photograph, in digital form, is the same photograph or a true copy of an original photograph printed on a medium.

They also make it possible to detect whether a candidate image is a reference image that has undergone morphing.

The degree of confidence achieved by embodiments of the present disclosure is at most 99.9%.

Embodiments of the present disclosure are naturally applicable to the verification of photographs in an identity document. In this context, a candidate image may be produced by a camera integrated into a communicating object.

The present disclosure is not limited to the embodiments described above. It is applicable to any type of image, not just to portraits.

It may be implemented, for example, in the field of art in order to authenticate a work.

To this end, provision is made to produce, by way of reference image, a two-dimensional photograph of a work under predetermined conditions of image capture (light, angle of view, aperture of the objective, etc.).

Subsequently, it is possible to then take, by way of candidate image, another two-dimensional photograph of the work under the same predetermined conditions of image capture.

If the candidate image and the reference image are correlated, since the conditions of image capture are the same, then this means that the photographed work is the same.

If the candidate image and the reference image were taken under different but known conditions of image capture, provision may be made to apply digital processing, equivalent to a filter, to correct the variations due to these differences in conditions of image capture.

Lastly, via the selection of the notable points, it is possible to cover all or some of the reference image, this making it possible to protect all or some of an image, for example by increasing the number of routes in a predetermined portion of the image.

Lastly, by virtue of embodiments of the present disclosure, it is possible to measure the distance between the local characteristics of the reference image and the same local characteristics in the candidate image with which it is compared.

Measurement of this distance makes it possible to determine the quality of the reproduction, or even to give an idea of the state of the original image, i.e., the reference image.

Specifically, the smaller this distance, the more it means that the candidate image resembles the reference image, and vice versa.

Embodiments of the present disclosure therefore make it possible to characterize not only whether the reference image has been manipulated, but also to characterize to what extent it has been manipulated. Furthermore, in the case where the reference image has not been manipulated, but has just aged, it is possible to characterize the greater or lesser extent of this aging.

The invention claimed is:

1. A method for processing a candidate digital image, the method comprising:
   defining a set of notable points on the candidate digital image;
   selecting a set of at least three notable points, comprising:
   a notable departure point,
   a notable arrival point, and a third notable point, distinct from the notable departure point and the notable arrival point, and not aligned with the notable departure point and the notable arrival point;

defining a set of at least one route between the notable departure point and the notable arrival point, the route being constrained by all of the selected notable points;

extracting local characteristics of pixels located along the defined at West one route;

recording, in fingerprint form, a signal corresponding to a variation in the local characteristics of each pixel along each of the defined at least one route;

comparing the fingerprint of the candidate digital image to a reference fingerprint; and generating a signal, the value of which depends on the result of the comparison.

2. The method of claim 1, further comprising:
defining a set of notable points on a reference digital image;
  selecting a set of at least two notable points on the reference digital image;
  defining a set of at least one route passing through the notable points selected on the reference digital image;
  determining at least one local characteristic of each pixel along each of the defined at least one route passing through the notable points selected on the reference digital image; and
  recording, as the reference fingerprint, a signal corresponding to a variation in the local characteristics, determined with regard to the reference digital image, as a function of each pixel along each of the defined at least one route on the reference digital image, the notable points selected on the reference digital image being the same as the notable points selected on the candidate digital image.

3. The method of claim 1, wherein defining the set of the at least one route comprises defining a linear or curved route between two consecutive notable points.

4. The method of claim 1, further comprising, prior to recording the fingerprint, filtering at least one among the candidate digital image and a reference digital image with a band-pass filter or a low-pass filter.

5. The method of claim 1, wherein defining the set of notable points comprises applying at least one among algorithms based on:
a Harris detector,
a scale-invariant feature transform,
speeded-up robust features,
an algorithm for detecting biometric points,
a derivation operator, and
an edge-detecting algorithm.

6. The method of claim 1, wherein comparing the fingerprint of the candidate digital image to the reference fingerprint comprises computing a Pearson correlation coefficient.

7. The method of claim 1, wherein extracting the local characteristics comprises extracting at least one among: light intensity,
intensity of one or two predetermined colors,
a high-frequency density above a predetermined threshold in a set of pixels around the pixels on the defined at least one route,
an orientation of the edges of shapes in the candidate digital image and crossed by a curve of the defined at least one route at each point on the defined at least one route, and a direction of a lightness gradient at each point on the defined at least one route.

8. The method of claim 1, wherein defining the set of at least one route between the notable departure point and the notable arrival point comprises defining a plurality of routes between the notable departure point and the notable arrival point.

9. A non-transitory computer-readable medium comprising a computer program comprising program-code instructions for executing, on a computer, the method of claim 1.

10. The method of claim 3, wherein defining the set of the at least one route comprises defining the curved route, defining the curved route comprising constraining the curved route with a set of Bezier curves that pass through the selected notable points or that minimize a distance to the selected notable points.

11. The method of claim 4, wherein the filtering comprises decomposing the signal, which is recorded as the fingerprint, via a discrete cosine transform.

12. The method of claim 5, wherein defining the set of notable points comprises applying the at least one among algorithms based on the derivation operator, the derivation operator being a difference-of-Gaussian operator.

13. The method of claim 5, wherein defining the set of notable points comprises applying the at least one among algorithms based on the edge-detecting algorithm, the edge-detecting algorithm being a Laplacian-of-Gaussian edge-detecting algorithm.

* * * * *

UNITED STATES PATENT AND TRADEMARK OFFICE
CERTIFICATE OF CORRECTION

| | |
|---|---|
| PATENT NO. | : 12,002,250 B2 |
| APPLICATION NO. | : 17/421486 |
| DATED | : June 4, 2024 |
| INVENTOR(S) | : Gaël Mahfoudi and Mohammed Amine Ouddan |

It is certified that error appears in the above-identified patent and that said Letters Patent is hereby corrected as shown below:

In the Specification

| | | |
|---|---|---|
| Column 7, | Line 63, | change "local characteristics." to --local characteristics:-- |
| Column 9, | Line 37, | change "following way." to --following way:-- |

In the Claims

| | | | |
|---|---|---|---|
| Claim 1, | Column 11, | Line 9, | change "at West one route;" to --at least one route;-- |
| Claim 7, | Column 12, | Lines 10-11, | change "one among: light intensity," to --one among: light intensity,-- |
| Claim 7, | Column 12, | Lines 19-20, | change "route, and a direction" to --route, and a direction-- |
| Claim 10, | Column 12, | Line 32, | change "set of Bezier curves" to --set of Bézier curves-- |

Signed and Sealed this
Fourth Day of March, 2025

Coke Morgan Stewart
*Acting Director of the United States Patent and Trademark Office*